UNITED STATES PATENT OFFICE.

JACOB S. ROBESON, OF CAMDEN, NEW JERSEY.

PROCESS OF TREATING WASTE SULFITE LIQUOR AND COMPOUND OBTAINED.

No. 833,634.        Specification of Letters Patent.        Patented Oct. 16, 1906.

Application filed March 12, 1906. Serial No. 305,705.

*To all whom it may concern:*

Be it known that I, JACOB S. ROBESON, a citizen of the United States, and a resident of Camden, Camden county, New Jersey, have invented an Improved Process of Treating Waste Sulfite Liquor and Compound Obtained Therefrom, of which the following is a specification.

My invention relates to the utilization of the waste liquor resulting from the manufacture of cellulose or fibers from various woods and woody materials, and particularly spruce-wood, (*Picea sp.*,) by boiling under pressure with a solution containing sulfurous acid and a base or bases, such as lime or magnesia, under what is known as the "sulfite process."

My invention consists of a special method of treating said waste liquor (hereinafter termed "sulfite liquor") whereby I am enabled to increase the density of the mass, which may be brought to a state of dryness, and thereby secure a composition of matter (which also constitutes part of my invention) having valuable properties and novel and unique characteristics which render it highly suitable for various purposes, notably as a binding agent for the material employed in the manufacture of cores for casting, as well as for other finely-divided inorganic material of varied character to form any desired shapes, forms, or masses.

The exact nature of the reaction in the treatment of wood by the sulfite process is not known, and it probably differs materially with each particular wood treated. In general it is known that the sulfite solution combines with and dissolves high-molecular complexes related to and associated with the cellulose without much changing their chemical nature or breaking down the molecules to any great extent, and it also dissolves an indefinite number of other bodies like tannins, gums, acids, sugars, &c. The principal body contained in these sulfite liquors has been called by many chemists, without necessarily implying any very definite conception of its chemical composition, a "lignosulfonate" of the base which occurred in the original sulfite solution—lignosulfonate of lime, for example. This word "lignosulfonate" must be taken purely as a group term, since the waste liquors derived from different woods are certainly very different, as different as the cellulose derived from the same woods, as I have found, for example, in the case of the liquor derived from spruce-wood, which displays many characteristics different from those of the other known liquors. The substances in the liquor, although sufficiently stable under the conditions of formation, seem to be quite sensitive when the liquor is heated elsewhere under improper conditions. Many efforts have been made to utilize this solution, since the highly colloid and adhesive nature of the dissolved solids render it of evident value if it could be concentrated to a useful degree. Simple evaporation in open pans has been repeatedly tried; but since this inevitably results in more or less decomposition, attended with the breaking down and deposition of insoluble forms of the organic bodies and the liberation of noxious gases, attention has lately been directed to various chemical treatments before or after evaporation. These methods, while perhaps valuable in certain cases, do not give the result sought—a concentrated solution of the substantially unchanged organic bodies from the wood in the sulfite solvent still preserving their highly colloid nature and great adhesiveness.

When evaporation is carried out in an open pan, the liquid, even when neutralized to begin with, rapidly becomes acid and evolves unpleasant gaseous products and also deposits insoluble matter, becoming turbid. Neutralization during evaporation does not seem to prevent this reaction. The resulting thickened solution does not possess the valuable properties which could have been expected from the character of the original sulfite liquor, and it has been found to have no commercial value.

The varying density of the liquor (a constant factor) renders its evaporation in an open pan impracticable, since not only is there the necessity for constant and careful regulation of the heat employed, but each batch of liquor must be differently treated, the initial heat applied in varying degree, and the resulting vapors, due to decomposition of the liquid as soon as an initial neutralization, if performed, has been destroyed, are so obnoxious as to render such treatment amenable to the laws regarding nuisances. Furthermore, in this treatment there is the necessity of regulating and quickly checking the heat when the concentrated liquor approaches the point of desired density, for it is well known that decomposition accelerates as the liquor thickens, and it is quite impossible to secure concentrated material of uniform density and composition. The difficulties attending this treatment, added to the impossibility of making a product such as I desire, render such atmospheric evaporation practically valueless. The cause of this decomposition of the liquor in the ordinary method of evaporation I am unable to state, merely noting the fact. It may perhaps be due to the high temperature incident to boiling under ordinary atmospheric pressure, a temperature, so to speak, exceeding the "critical temperature" of the sulfite combinations heated alone and without the presence of the excess of sulfur compounds which they had in the digester, or it may be due to oxidation phenomena, or very likely to both combined. At all events I have discovered that if the sulfite liquor be nearly or quite neutralized by any convenient base, such as soda or lime, and then evaporated quickly at a temperature not exceeding 100° centigrade, under exclusion of air, it may be brought down to any desired degree of concentration, or even to dryness, without decomposition and without loss of its colloid nature, adhesive character, or other properties. While there are certain other sulfite liquors which are alleged to stand an evaporation at temperatures slightly above 100° centigrade, this is not possible with spruce liquor showing one of the radical differences I have found to exist.

Evaporation may be effected by a wide variety of machines and methods so long as the temperature is carefully controlled and the oxidizing influence of the air excluded. The liquor may, for instance, be condensed by a stream of gas circulating in a closed circuit through a heater, through or over the solution, through a condenser, conveniently water-cooled, back through the heater, and so on, by bubbling the gas through the solution or over thin films formed by rotating devices, or in any other convenient manner. Any indifferent gas may be employed—nitrogen, carbon dioxid, producer-gas, or even air, the last-named in the limited amount contained in an ordinary closed-circuit apparatus not possessing enough oxygen to harmfully affect more than the first portions of solution treated, which may of course be run to waste, if necessary; but at present I prefer vacuum evaporation, either in an ordinary vacuum-pan or in the transit-film evaporators.

I regard my invention as covering, broadly, any method of concentrating the solution, employing a relatively low temperature, below the normal boiling-point of water, and operating under exclusion of oxidation.

When overheated locally or throughout its mass, sulfite liquor begins to decompose, and when this reaction once sets in it appears to be self-accelerating to an indefinite extent. For this reason in evaporation even in vacuum-pans it is necessary not only to guard against overheating of the whole mass of liquid, but such local overheating as might result from the use of high-pressure steam or improperly-designed heating elements.

In carrying out my invention I take the waste sulfite liquor as it comes from the digester and render it neutral, or substantially so, by the addition of a suitable alkali or alkaline earth, such as milk of lime or caustic soda, as may be most convenient or desirable. The quantity of the neutralizing agent used will vary, depending upon the quantity of free acid in the sulfite liquor, and the amount to be added to render such liquor neutral, or nearly so, may be determined by the usual tests. After the sulfite liquor has been neutralized (and I may state that it is not necessary to make it absolutely neutral, as a liquor very slightly acid will produce equally desirable results) I concentrate the sulfite liquor after the manner above noted. The sulfite liquor is treated until it has been concentrated to a consistency of about 30° Baumé, such liquor having been received in the concentrating apparatus in a very thin state.

In neutralizing, care must be taken not to overstep the neutral point by an addition of an excess of alkali, since in the presence of alkalies the complex compounds formed by sulfites with organic matters tend to break up.

In the operation of the method of evaporation according to my present invention the condensed vapors are innocuous and may be utilized should occasion require or run to waste without danger of causing any harmful results.

When employed in the manufacture of sand cores or the making of any shapes from finely-divided inorganic matter, the concentrated material is employed in the form of a liquid, preferably at a density from 18° to 20° Baumé, and it will be understood that the density of the material in the liquid form will depend upon the use to which it is to be put. For certain commercial purposes, however, I may evaporate or concentrate the waste liquor to dryness, in which state it may be in a flaky condition and may be reduced to powder by any suitable means. When used in connection with the manufacture of cores, the required amount of this powder may be added to a quantity of water sufficient to bring the mixture to the required density to form the binding agent.

In connection with my work of utilizing waste sulfite liquors I have had much occasion to handle that resulting from the treatment of spruce-wood (*Picea sp.*) by the usual bisulfite methods of recovering cellulose. This liquor appears to contain substances differing quite materially from those found in other sulfite liquors, and for chemical reasons it undoubtedly does. From the work of the various chemists who have investigated the natural celluloses it appears that there are substantial differences in the cellulose containing complexes or molecules which form the ultimate basis of each individual wood or fiber, these differences corresponding to the well-known physical differences of the various woods and fibers of commerce. The cellulose portion of the molecule is probably, broadly considered, much the same in each woody fiber, or at least that portion which is split off by the sulfite treatment and called "cellulose;" but the portion which goes into solution in the bisulfite is quite different in molecular magnitude and other respects. This difference in magnitude of the portion dissolving and the portion undissolved causes the difference in yield with various woods under the same process, and the chemical difference is the reason why a method of sulfite cooking (concentration of liquor, heat, &c.) adapted to one wood is seldom applicable to another without modification. The conclusion that physical differences in the wood are largely functions of chemical differences in the fiber is corroborated by experience with various sulfite liquors wherein the complex, usually called "lignone," which is united with the sulfite radical, appears to be quite different in the liquors from different woods. The liquor from spruce yields products by my method which appear to have exceptionally advantageous properties for many commercial uses. My process appears particularly adapted to this liquor, and my products therefrom are specially advantageous.

Concentrated sulfite liquors made by my process differentiate from those of the prior art by the fact that they give no precipitate with strong solutions of gelatin or glue.

The resultant dried mass from the concentrated and undecomposed liquor is in a flaky condition, and a fluid solution of the same or the concentrated liquor formed by my method may be distinguished from the liquor concentrated by prior methods or processes by its relative clearness or translucency and by its complete solubility in water, the products previously known having a markedly muddy or turbid appearance and containing particles of insoluble material resulting from decomposition. By the addition of a quantity of water equaling that removed by evaporation the original liquor may be reproduced, showing that its constituents have undergone no injurious change.

I have discovered that this neutral and concentrated composition of matter produced by my improved process or method is very suitable for mixing with sand to form cores, the particular advantage and property being that it will combine with all known sands, causing the same to pack and adhere and retain their size and shape when dry, a condition unattained by the use of any of the usual or well-known so-called "core compounds" or core-sand-binding materials or adhesives in use at the present time. In addition, it may be employed as a binder for all kinds of inorganic granular material in making plastic masses.

When employed with material that is ground or milled preparatory to being molded into shape, the concentrated material to form the binding agent may be added in the dry state and ground or milled or otherwise mixed with the other material, and the mixture thus prepared requires simply the addition of water to bring it to the desired molding or shaping condition.

I claim—

1. The method of treating waste sulfite liquor, which consists in rendering such liquor substantially neutral, and then concentrating it *in vacuo*.

2. The method of treating waste sulfite liquor, which consists in rendering such liquor substantially neutral by the addition of milk of lime, and then evaporating said mixture *in vacuo*.

3. The method of treating waste sulfite liquor, which consists in rendering such liquor substantially neutral, and then evaporating it *in vacuo* to a consistency of about 30° Baumé.

4. The method of treating waste sulfite liquor, which consists in rendering such liquor substantially neutral by the addition of milk of lime, and then evaporating said mixture *in vacuo* to a consistency of about 30° Baumé.

5. The method of treating waste sulfite liquor from the digestion of spruce-wood, which consists in rendering such liquor substantially neutral, and then concentrating it *in vacuo*.

6. The method of treating waste sulfite liquor from the digestion of spruce-wood, which consists in rendering such liquor substantially neutral by the addition of milk of lime, and then evaporating it *in vacuo*.

7. The method of treating waste sulfite liquor from the digestion of spruce-wood, which consists in rendering such liquor substantially neutral, and then evaporating it *in vacuo* to a consistency of about 30° Baumé.

8. The method of treating waste sulfite liquor from the digestion of spruce-wood, which consists in rendering such liquor substantially neutral by the addition of milk of lime, and then evaporating said mixture *in vacuo* to a consistency of about 30° Baumé.

9. A composition of matter consisting of a concentrated, substantially neutral and clear solution of the essential substances of waste sulfite liquor chemically unchanged.

10. A composition of matter consisting of a substantially neutral and concentrated mass of waste sulfite liquor, relatively clear or translucent on initial concentration, and having strong adhesive properties.

11. A composition of matter consisting of a substantially neutral and concentrated mass of waste sulfite liquor reduced to a consistency of about 30° Baumé, relatively clear or translucent on initial concentration, and having strong adhesive properties.

12. A composition of matter consisting of a substantially neutral, concentrated and undecomposed mass of waste sulfite liquor, relatively clear or translucent on initial concentration, and having strong adhesive properties.

13. A composition of matter consisting of a substantially neutral, concentrated and undecomposed mass of waste sulfite liquor reduced to a consistency of about 30° Baumé, relatively clear or translucent on initial concentration, and having strong adhesive properties.

14. An adhesive product consisting of the concentrated constituents of waste sulfite liquor, characterized by having had a neutralizing agent added thereto, by being entirely soluble, and by being relatively clear or translucent on initial concentration.

15. An adhesive product consisting of the constituents of waste sulfite liquor in a concentrated state, characterized by having had a neutralizing agent added thereto, the bulk of the water extracted therefrom, by being entirely soluble, and by being relatively clear or translucent on initial concentration.

16. An adhesive product consisting of the concentrated constituents of a neutralized mass of waste sulfite liquor, characterized by having had a neutralizing agent added thereto, by being entirely soluble, and by being relatively clear or translucent on initial concentration.

17. An adhesive comprising a concentrated waste sulfite liquor, clearly soluble in water, and in strong solutions not precipitating glue solutions.

18. An adhesive comprising a concentrated waste sulfite liquor from the digestion of spruce-wood, clearly soluble in water, and in strong solutions not precipitating glue solutions.

19. A composition of matter consisting of a concentrated substantially neutral clear solution of the essential substances of waste sulfite liquor from the digestion of spruce-wood chemically unchanged.

20. A composition of matter consisting of a substantially neutral and concentrated mass of waste sulfite liquor from the digestion of spruce-wood, relatively clear or translucent on initial concentration, and having strong adhesive properties.

21. An adhesive product consisting of the concentrated constituents of waste sulfite liquor from the digestion of spruce-wood, characterized by having had a neutralizing agent added thereto, by being entirely soluble, and by being relatively clear or translucent on initial concentration.

In testimony whereof I have signed my name to this specification in the presence of two subscribing witnesses.

JACOB S. ROBESON.

Witnesses:
MADGE E. KEIR,
EDNA W. COLLINS.